United States Patent [19]

Maxwell

[11] Patent Number: 5,333,638
[45] Date of Patent: Aug. 2, 1994

[54] AUTOMATIC RECIRCULATION VALVE

[75] Inventor: Horace J. Maxwell, Langhorne, Pa.

[73] Assignee: Keystone International Holdings Corp., Wilmington, Del.

[21] Appl. No.: 6,934

[22] Filed: Jan. 21, 1993

[51] Int. Cl.⁵ .............................................. G05D 7/01
[52] U.S. Cl. ...................... 137/116; 137/117; 137/625.38; 251/282; 417/299
[58] Field of Search ............... 137/116, 117, 625.38; 251/282; 417/299

[56] References Cited

U.S. PATENT DOCUMENTS

| | | | |
|---|---|---|---|
| 60,378 | 12/1866 | Hunt | 137/625.38 |
| 1,555,851 | 10/1925 | Van Emon | 251/282 X |
| 4,095,611 | 6/1978 | Hetz | 137/117 X |
| 4,244,388 | 1/1981 | Feiss | 137/116 |
| 4,779,639 | 10/1988 | Loos | 137/117 |
| 4,941,502 | 7/1990 | Loos et al. | 137/117 X |
| 4,967,783 | 11/1990 | Loos | 137/117 X |

FOREIGN PATENT DOCUMENTS 1228919  4/1971  United Kingdom ................ 417/299

Primary Examiner—Robert G. Nilson
Attorney, Agent, or Firm—John W. Logan, Jr.

[57] ABSTRACT

An automatic recirculation valve having an inlet, a main outlet, and a recirculation outlet. A main valve element responsive to the flow between the inlet and main outlet and a bypass element responsive to the main valve element regulates the fluid flow to the recirculation outlet. The bypass element contains orifices through which the fluid flows to the recirculation outlet. The orifices are arranged to counterbalance fluid forces exerted on the bypass element.

14 Claims, 2 Drawing Sheets

AUTOMATIC RECIRCULATION VALVE

BACKGROUND OF THE INVENTION

The present invention relates to automatic recirculation valves and, more particularly, to recirculation valves directed to regulating the bypass recirculation flow in centrifugal pump systems.

Recirculation valves are frequently used in centrifugal pump applications to prevent pump overheating and maintain hydraulic stability. Pump overheating results from the transfer of heat energy created by the pump to the fluid flowing therethrough. During normal operating conditions (normal downstream demand for the pumped fluid) in a properly designed system, there is sufficient flow through the pump to absorb and carry away the transferred heat and thereby prevent overheating. During periods of low flow demand, however, the slower moving or even stagnant fluid absorbs a much greater amount of heat during its residence time in the pump, causing a substantial increase in the temperature of the fluid therein. As the temperature of the fluid within the pump increases, its vapor pressure increases, leading to cavitation which can damage the pump impeller and housing.

Low flow conditions can also result in a phenomenon classically known as internal recirculation. Under low flow conditions, hydraulic anomalies can occur within the pump. These anomalies are fluid responses to the less than optimum internal geometry of the pump at low flow rates and are generally initiated in the region where the fluid discharges the impeller near the pump housing discharge. This phenomenon, known as internal recirculation, results in cavitation which can damage the pump impeller.

Recirculation valves prevent pump overheating and maintain hydraulic stability by providing a secondary path through which the pump can maintain a sufficient fluid flow during periods of low downstream flow demand. One commonly used type of recirculation valve is a modulating flow valve as disclosed in U.S. Pat. No. 4,095,611 and U.S. Pat. No. 4,941,502. These patents disclose valves having an inlet, a main outlet, a recirculation outlet, a main flow element, and a bypass element with slotted orifices. Such valves are located downstream of the pump. Fluid enters the valve from the pump through the inlet, and exits the valve through the main outlet to satisfy the downstream demand. The recirculation outlet is connected to a secondary fluid path such as a low pressure reservoir or the pump inlet whereto the fluid is directed during periods of low flow demand in the main outlet.

The main valve element senses the rate of flow between the valve inlet and main outlet. During periods of normal downstream demand, a pressure differential across the main valve element causes the valve element to open and permit flow to the main outlet, while simultaneously causing the bypass valve element to close and prevent fluid flow to the recirculation outlet. Conversely, during intervals of low downstream demand, the main valve element returns to a closed (seated) position, thereby opening the bypass element and permitting flow through the recirculation outlet to the secondary path. Additionally, the main valve element, when seated, serves as a check valve which prevents reverse rotation of the pump impeller when the pump is shut down.

A problem associated with the use of such recirculation valves is that unbalanced fluid pressure forces acting on the bypass element may unsteady the bypass element's movement as the element approaches its open or closed position. This impairs the recirculation and checking performance of the valve. The bypass valve element comprises slotted orifices in the walls of a hollow shaft through which the fluid flows from the valve inlet to the recirculation outlet during periods of low flow. The orifices are opened and closed by modulating the hollow shaft relative to a stationary valve member that blocks the orifices when in the closed position. It has been found that the fluid forces exerted along the walls of the orifices are not uniform, particularly as the bypass element approaches the bypass opening or closing position. This results in a net force acting on the shaft that can unsteady its movement and impair the performance of the recirculation valve.

Accordingly, it is an object of the present invention to provide an improved recirculation valve.

Another object is to provide a recirculation valve with a smoother performing bypass valve element.

A further object of the invention is to provide a bypass valve element for recirculation valves that balance out fluid pressure forces acting on the orifices to provide more reliable performance.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention provides an improved automatic recirculation valve for protecting a centrifugal pump from damage due to overheating or hydraulic fluid instabilities. The invention comprises a valve having an inlet, a main outlet, a recirculation outlet, a main valve element responsive to flow between the inlet and main outlet, and a bypass element responsive to the main valve element for regulating the fluid flow between the inlet and the recirculation outlet. The bypass element comprises a first and second orifice opening through which the recirculation fluid flows. The two orifice openings are arranged such that the fluid pressure force acting on one orifice opening is counterbalanced by the fluid pressure force acting on the other, thereby providing a smoother performing bypass element which moves uniformly with main flow changes to provide an improved recirculation valve.

BRIEF DESCRIPTION OF THE DRAWINGS

The foregoing summary, as well as the following detailed description will be better understood when read in conjunction with the figures appended hereto. For the purpose of illustrating the invention, there is shown in the drawings an embodiment which is presently preferred, it being understood, however, that this invention is not limited to the precise arrangement and instrumentalities shown.

DETAILED DESCRIPTION OF THE INVENTION

Figure 1:
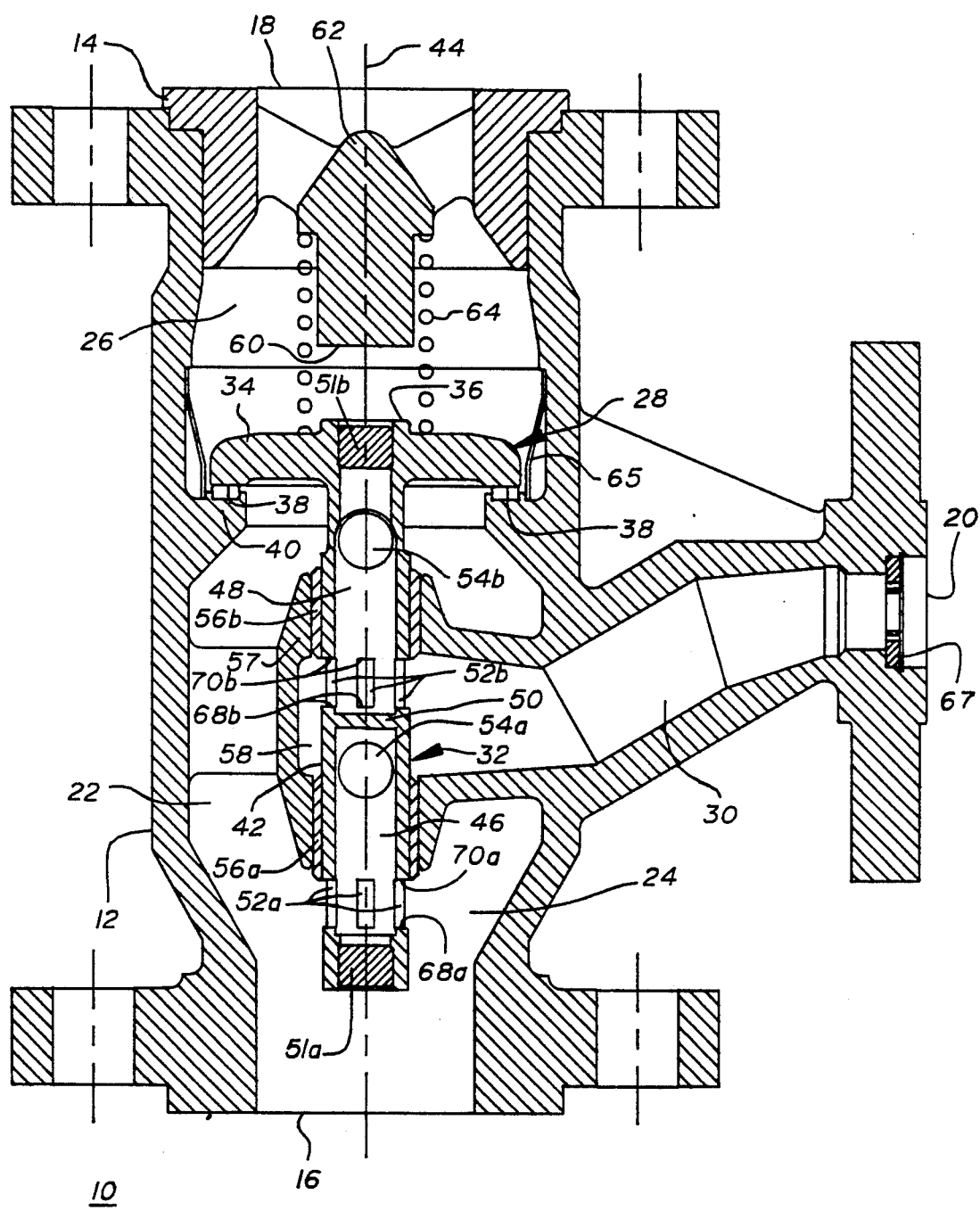
FIG. 1 is a sectional view of a recirculation valve in accordance with this invention illustrating the closed position of the main valve member and the fully open position of the bypass element.

Referring to the drawing, there is illustrated in FIG. 1 a modulating recirculation control valve 10 in accordance with the present invention comprising a main body 12 and bonnet piece 14 attached to main body 12. Bonnet piece 14 can be attached to main body 12 by any suitable means, including threaded, screwed or bolted connection. The recirculation valve 10 has an inlet 16 which is connected to the downstream side of a centrifugal pump for receiving pumped fluid, a main outlet 18 wherethrough the fluid flows to the source of the downstream pump demand, and recirculation outlet 20 wherethrough pumped fluid is directed during periods of low downstream pump demand to a low pressure reservoir or returned to the pump inlet. Flanged connections are shown for the inlet and two outlets, however, any suitable pipe connection means may be used.

Extending between inlet 16 and main outlet 18 is main passageway 22 comprising a lower main passageway 24 and an upper main passageway 26 divided by main valve element 28 to be described below. Bypass passageway 30 extends from lower passageway 24 to recirculation outlet 20 and is separated from lower main passageway 24 by bypass valve element 32 to be described below.

Regulating the recirculation flow are the internal valve elements including the main valve element 28 positioned within fluid passageway 22 and moving responsively to the fluid flow therethrough, and bypass element 32 positioned to control fluid flow between lower main passage 24 and recirculation passage 30 in response to the movement of main valve element 28.

The main valve element 28 comprises a circular valve disc 34, a top face 36, and a sealing face 38 for sealing main valve element 28 against a valve seat 40 when the main valve element is in the fully closed position. Seat 40, as illustrated, is formed as part of main valve body 12, but may also comprise a separate replaceable seat element.

Attached to and moving with main valve element 28 is bypass valve element 32 comprising a cylindrical shaft 42. Shaft 42 is interposed within the lower main passageway 24 along the vertical center axis 44 of valve 10. Shaft 42 comprises two hollow chambers, a lower shaft chamber 46 and an upper shaft chamber 48 separated by a divider member 50 and sealed at the ends by threaded or welded plugs 51a and 51b. Lower shaft chamber 46 communicates with the lower main passageway 24 through slotted orifices 52a, and with recirculation passageway 30 through circular aperture 54a. Similarly, though inversely, upper shaft chamber 48 communicates with the lower main passageway 24 through circular aperture 54b, and with the recirculation passageway through slotted orifices 52b.

Cylindrical shaft guide bushings 56a, 56b, affixed to integral body shaft guide 57, support and guide bypass element 32, permitting vertical movement of the bypass element along the vertical axis 44. Integral body shaft guide 57, formed as part of body 12, also forms annulus medial cavity 58 which is part of and communicates with recirculation passageway 30.

The vertical movement of bypass element 32 is controlled by the movement of main valve element 28 to which bypass element 32 is attached. Main valve element 28 can move between its fully closed position whereby the sealing face 38 seats against valve seat 40, and its fully open position whereby top face 36 abuts against the bottom face 60 of bonnet hub 62 interposed in the upper main passageway 26 and attached to bonnet piece 14. As shown, bonnet hub 62 is formed as part of bonnet piece 14.

Helical spring 64, connected at one end to bonnet hub 62 and at the other end to main valve element 28, is in compression to urge main valve element 28 into the fully closed position.

The characteristics and performance of valve 10 can be altered to meet the particular requirements of each application. An annular valve insert 65 can be added as shown in FIG. 1 to alter the spacing between the valve disc 34 and the internal wall of valve body 12 through which the fluid flows. This controls the movement of valve element 28 relative to the rate of fluid flow past the valve element 28. The inserts can be shaped for particular requirements and can be made out of any suitable material such as sheet metal. The valve 10 can also be sized for a particular fluid pressure and/or flow rate in the recirculation passageway 30 by adding an orifice plate 67 to the recirculation outlet 20.

Having described the preferred embodiment of a recirculation valve assembly in accordance with the present invention, its operation is now explained. Referring to FIG. 1, inlet 16 is connected to the outlet of the pump, main outlet 18 is connected to the source of the downstream demand, and recirculation outlet 20 is connected to a low pressure reservoir or to the inlet side of the pump.

As illustrated in FIG. 1, the main valve element 28 is closed since there is no downstream demand for fluid entering through inlet 16. With no downstream demand, the fluid pressures in upper main passageway 26 and lower main passageway 24 equalize, counterbalancing the fluid pressure forces on valve disc 34 and allowing spring 64 to urge the main valve element 28 into its fully closed position. Moving with the main valve element 28, the bypass element 32 is moved downward into its fully open position.

In its fully open position, bypass element 32 permits fluid flow from the lower main passageway 24 to the recirculation passageway 30, thereby directing fluid entering inlet 16 to recirculation outlet 20. Shaft chambers 46 and 48 provide two independent pathways for the recirculation flow. The fluid can enter lower shaft chamber 46 from lower main passageway 24 through slotted orifices 52a, and exit to recirculation outlet passageway 30 through circular aperture 54a. Alternatively, the fluid can enter upper shaft chamber 48 from lower main passageway 24 through circular aperture 54b, and exit to recirculation outlet 30 through slotted orifices 52b. Both shaft chamber pathways are equally accessible to the fluid entering from inlet 16.

Upon demand for fluid downstream of main outlet 18, a pressure differential is formed between lower passageway 24 and upper passageway 26, creating a net resultant fluid force on the valve disc 34. When this fluid force exceeds the force exerted by spring 64 on the valve disc 34, main valve member 28 and attached bypass element 32 move upward along axis 44 towards the main valve member's fully open position. Under normal downstream demand conditions, the resulting net force is large enough to move the main valve element 28 to its fully open position, thereby moving the attached bypass element to its fully closed position.

When the bypass element is fully closed (not shown), it is seen that the slotted orifices 52a and 52b align adjacently with shaft guide bushings 56a, 56b to completely cover the slotted orifices 52a and 52b, thereby preventing fluid flow therethrough.

Figure 2:
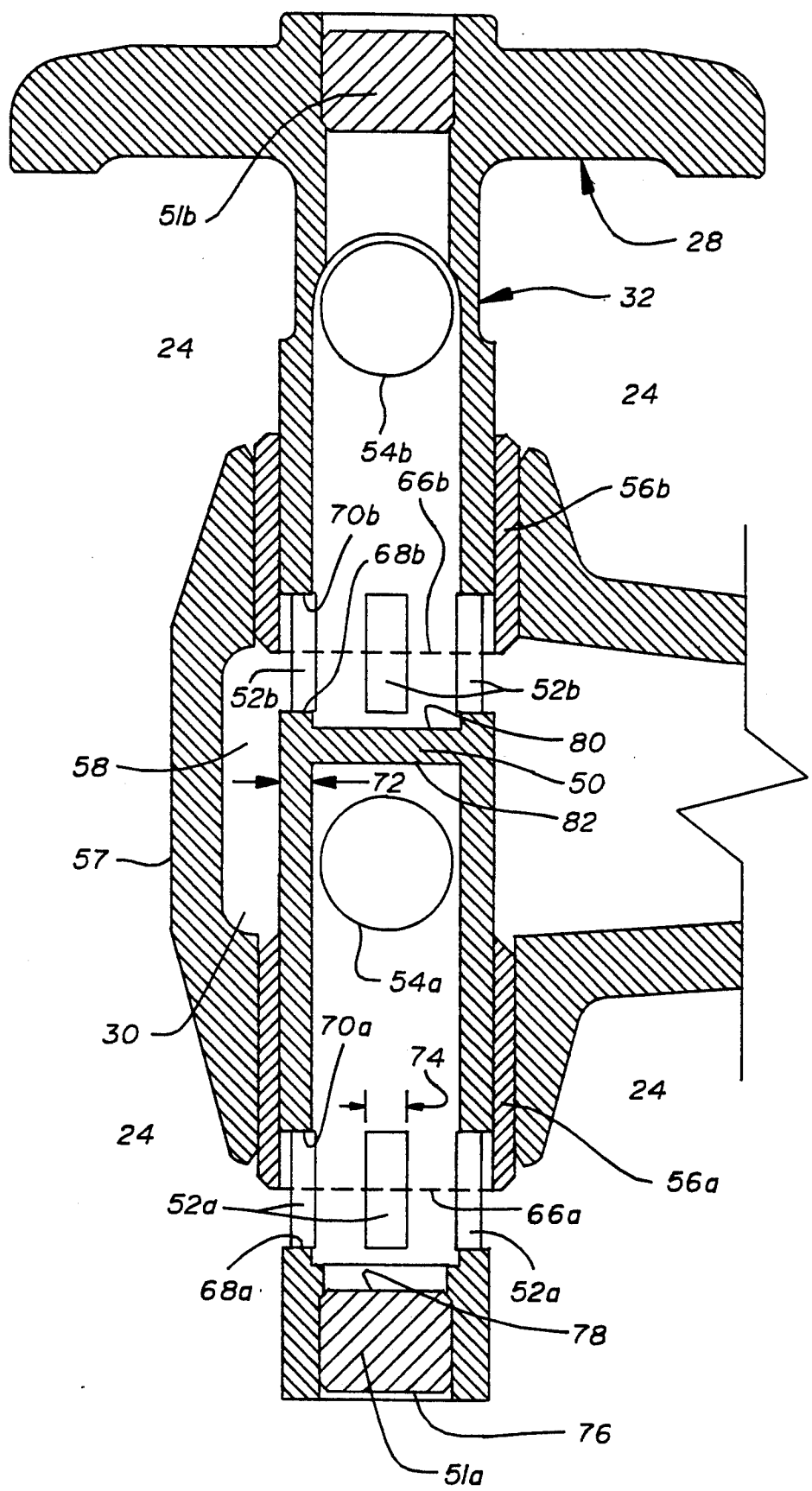
FIG. 2 is an enlarged sectional view of the bypass element shown in a partially open position.

Intermediate the fully open and fully closed positions, bypass element 32 is partially open, i.e., slotted orifices 52a and 52b are partially covered by shaft guide bushings 56a, 56b as shown in FIG. 2. Recirculation fluid flows through bypass element 32, the rate of flow depending on the area of the slotted orifices not covered by shaft guide bushings 56a, 56b. It has been found that while the bypass element is in an intermediate position, fluid pressure forces act on the walls of the slotted orifices 52a, 52b. As will be discussed below, these forces can be counterbalanced to provide steadier movement of the main valve and bypass elements.

When the bypass element is in an open position (not fully closed), high pressure fluid in the lower passageway 24 flows to the recirculation passage 30 where the fluid pressure is substantially lower. The drop in pressure of the fluid mainly occurs as it flows through the restrictive openings, defined by slotted surfaces 52a and 52b when bypass element 32 is fully open as in FIG. 1, or by that part of the slotted orifices 52a and 52b not covered by shaft guide bushings 56a, 56b when bypass element 32 is partially open as in FIG. 2. For illustrative purposes, dotted lines 66a and 66b represent the edge of shaft guide bushings 56a, 56b, defining the top portion of the restrictive openings when the bypass is partially open.

Referring to FIG. 1, it is seen that when the bypass element 32 is fully open, the restrictive opening is defined by the bottom wall 68a and the top wall 70a of slotted orifice 52a (see FIG. 2 for 68a and 70a). The walls are defined by shaft wall width 72 and slotted orifice width 74. Both the bottom 68a and top wall 70a are exposed to high pressure fluid on the lower passageway side 24, and low pressure fluid on the shaft chamber 46 side. The pressure force acting on the bottom wall 68a is equal in magnitude but opposite in direction to that on the top wall 70a. These two forces counterbalance each other, and thus there is no net pressure force acting on the bypass element 32 from the orifice.

The slotted orifices 52b operate similarly when the bypass element is fully open. Fluid forces on the top wall 70b counterbalance the forces on the bottom wall 68b resulting in no net pressure forces on the bypass element 32 from the orifice.

When the bypass element 32 is fully closed, it is understood that orifices 52a and 52b are completely covered by shaft guide bushings 56a, 56b. The bottom and top walls of the slotted orifice 52a are equally exposed to only low pressure fluid, while the bottom and top walls of the slotted orifice 52b are equally exposed to only high pressure fluid. As with the fully open position, fluid pressure forces acting on the walls of each orifice are counterbalanced and no net forces act on bypass element 32.

When the bypass is partially open, however, net pressure forces may act on each slotted orifice. Referring to FIG. 2, the restrictive opening is defined by the bottom wall 68a of slotted orifice 52a and the edge 66a of shaft guide bushing 56a, across which the pressure drop now occurs. The top wall 70a of each slotted orifice 54a is now exposed only to low pressure fluid, which is similar in pressure to the low pressure fluid of recirculation passageway 30, while the bottom wall 68a is exposed primarily to the high pressure of the lower passageway 24. This difference in pressure exposure between top wall 70a and bottom wall 68a results in a net force acting on the internal walls of each slotted orifices 52a, urging the bypass element 32 downward towards a fully open position. If not counterbalanced, the resultant force would interfere with the desired movement of the bypass element 32.

A means for counterbalancing the net pressure force on slotted orifices 52a is provided by the second set of slotted orifices 52b which develop an equal, but opposite force to that on orifices 52a. As shown in FIG. 2, the restrictive opening is defined by the edge 66b of shaft guide bushing 56b and the bottom 68b of slotted orifice 52b across which the pressure drop from the high pressure shaft chamber 48 to the low pressure recirculation passageway 30 occurs. The top wall 70b is exposed only to the high pressure fluid of the upper chamber 48, which is similar in pressure to the high pressure fluid of the lower passageway 24, while the bottom wall 68b is exposed primarily to the low pressure fluid of the recirculation passageway 30. The difference in pressure between walls 70b and 68b results in a net force equal in magnitude to that acting on orifice 52a, but acting in the opposite direction to urge bypass element 32 upward towards a fully closed position, thus counterbalancing the pressure force on 52a. In the embodiment shown, an equal number of slotted orifices 52b of equal size are provided to counterbalance the orifices 52a. It is understood, however, that the actual number of counterbalancing orifices need not be equal as long as the sum of all the net pressure forces, acting on one group of slotted orifices in one direction is counterbalanced by the sum of net pressure forces acting on the other group of slotted orifices. The counterbalancing of such pressure forces acting on the slotted orifices permits steady movement of the bypass element as designed.

The present embodiment also counterbalances any fluid pressure forces acting on divider member 50 and plug 51a that may also unsteady the motion of the main valve element 28. A net force, resulting from the high pressure of lower passageway 24 acting on outer plug surface 76 and the low fluid pressure of chamber 46 acting on inner plug surface 78, urges plug 51a towards the fully open position. This is counterbalanced by a net force, resulting from the high pressure of upper chamber 48 acting on divider surface 80 and the low pressure of lower chamber 46 acting on divider surface 82, that urges the valve element 28 towards the fully closed position.

While a particular embodiment of the present invention is disclosed herein, it is not intended to limit the invention to such disclosure, and changes and modifications may be incorporated and embodied within the scope of the following claims.

What is claimed is:

1. An automatic recirculation valve comprising:
   an inlet;
   a main outlet;
   a recirculation outlet;
   a main valve element responsive to flow between said inlet and said main outlet; and
   a bypass valve element responsive to movement of said main valve element for regulating the flow of fluid between said inlet and said recirculation outlet, said bypass element comprising an orifice opening; and means for counterbalancing the fluid pressure forces acting on said orifice opening, said counterbalancing means comprising a second orifice opening in said bypass element.

2. An automatic recirculation valve, according to claim 1 wherein said bypass valve element comprises two hollow chambers, wherein said first orifice opening permits fluid communication with said first hollow chamber and said second orifice opening is located to permit fluid communication with said second hollow chamber.

3. An automatic recirculation valve in accordance with claim 2, further comprising an insert for controlling the space through which fluid flows between said main valve element and a wall of the valve located adjacent said main valve element.

4. An automatic recirculation valve in accordance with claim 2, further comprising an orifice plate through which recirculation fluid flows.

5. An automatic recirculation valve, according to claim 1, further comprising an insert for controlling the space wherethrough fluid flows between said main valve element and a wall of the valve located adjacent said main valve element.

6. An automatic recirculation valve, according to claim 1, further comprising an orifice plate through which the recirculation fluid flows.

7. An automatic recirculation valve in accordance with claim 1, further comprising an insert for controlling the space wherethrough fluid flows between said main valve element and a wall of the valve located adjacent said main valve element.

8. An automatic recirculation valve in accordance with claim 1, further comprising an orifice plate through which recirculation fluid flows.

9. An automatic recirculation valve in accordance with claim 1 wherein said bypass valve element comprises first and second hollow chambers, said first orifice opening located to permit fluid flow through said first hollow chamber, said second orifice opening located to permit fluid flow through said second hollow chamber.

10. A bypass valve element for controlling the recirculation flow in an automatic recirculation valve having an inlet, a main outlet, a recirculation outlet, and a main valve element responsive to flow between said inlet and said outlet, said bypass valve element comprising:
a shaft;
a hollow chamber within said shaft; and
first and second orifice openings allowing fluid flow through said chamber between said inlet and said recirculation outlet, said first orifice opening counterbalancing the fluid pressure forces acting on said second orifice opening.

11. A bypass valve element according to claim 10, further comprising a second hollow chamber within said shaft, wherein said first orifice opening allows fluid communication with one said chamber and said second orifice opening allows fluid communication with said second chamber.

12. An improved automatic recirculation valve for counterbalancing fluid pressure forces, comprising:
an inlet;
a main outlet;
a recirculation outlet;
a main valve element responsive to flow between said inlet and said main outlet; and
a bypass element responsive to said main valve element for regulating the flow between said inlet and said recirculation outlet, said bypass element comprising
a shaft having first and second hollow chambers,
a first orifice opening in said first chamber allowing fluid communication between said inlet and said first chamber, and
a second orifice opening in said second chamber allowing fluid communication between said second chamber and said recirculation outlet, wherein fluid pressure forces acting on said second orifice opening counterbalance the fluid forces acting on said first orifice opening.

13. An improved automatic recirculation valve according to claim 12 further comprising an orifice plate through which recirculation fluid flows.

14. An improved automatic recirculation valve according to claim 12 further comprising a valve body integral with said inlet, said main outlet and said main recirculation outlet.

* * * * *